Feb. 8, 1966  C. R. CANALIZO ETAL  3,233,472
GAS POWERED TIMER
Original Filed May 18, 1959
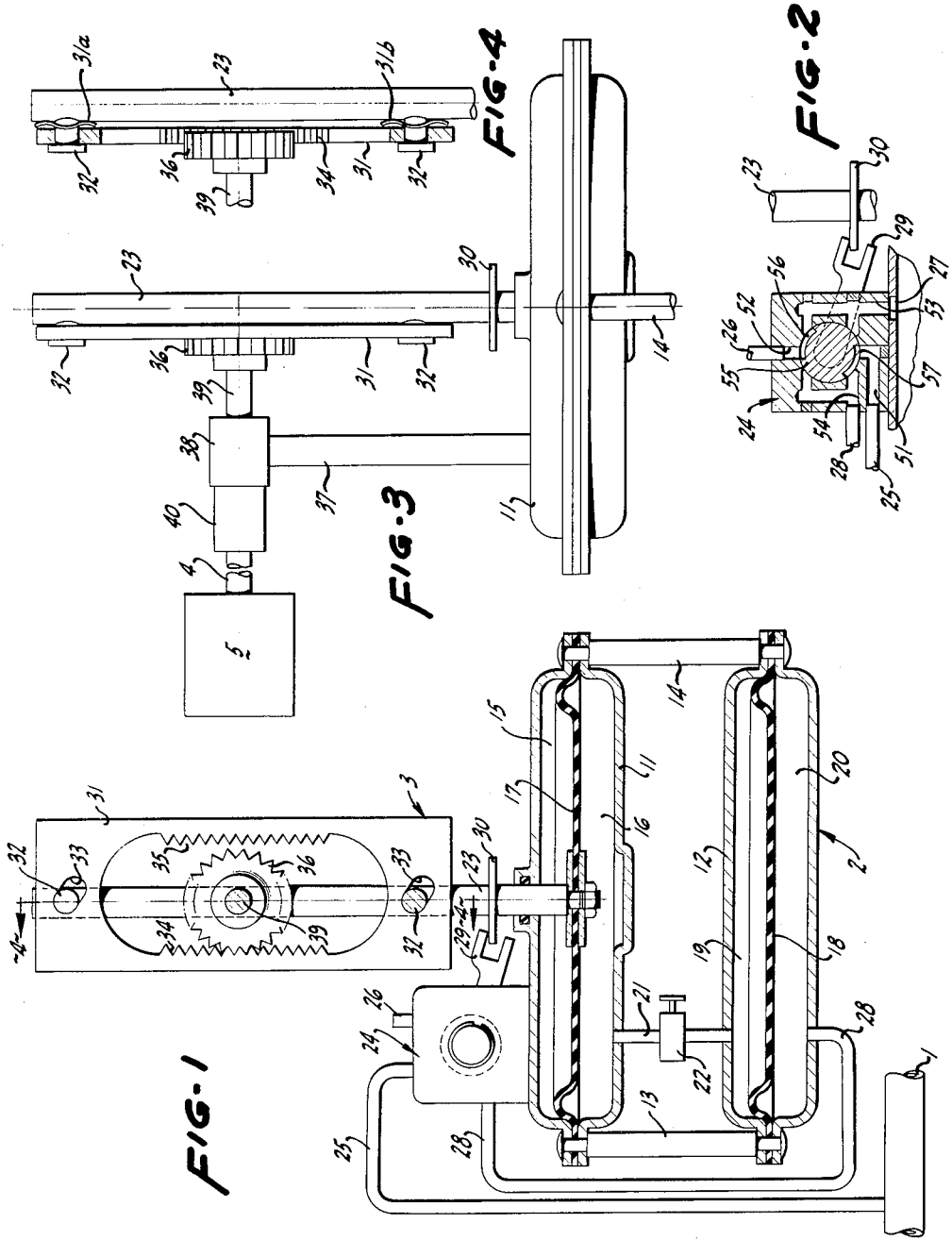
INVENTORS
CARLOS R. CANALIZO
SHELBY J. GRAVES
BY
Mellin and Hanscom
ATTORNEYS

3,233,472
GAS POWERED TIMER

Carlos R. Canalizo, Dallas, and Shelby J. Graves, Irving, Tex., assignors, by mesne assignments, to Otis Engineering Corporation, Dallas County, Tex., a corporation of Delaware
Original application May 18, 1959, Ser. No. 813,758, now Patent No. 3,064,628, dated Nov. 20, 1962. Divided and this application May 8, 1962, Ser. No. 193,268
3 Claims. (Cl. 74—30)

This invention relates to apparatus for driving a clock, chart recorder, or other such mechanism, and more particularly involves a timer device which utilizes a source of substantially constant fluid pressure for producing a continuous rotational movement. This application is a division of our co-pending application, Serial No. 813,758, filed May 18, 1959, and issued as United States Patent No. 3,064,628.

The instrumentation of many industries includes the use of timer devices for driving recorder charts and the like; and very often these devices are employed in remote or relatively inaccessible locations. In the oil and gas industry, for example, wells are oftentimes drilled in non-electrified areas, and in such instances it is customary to employ mechanically wound devices which require periodic attention. Electrical timing devices have also been used, but since they require an auxiliary source of power for their operation, special power lines must be strung to the well site, or else power is supplied from motor-generator units.

In view of these conditions, it is one object of this invention to provide a timer system which is operated by a source of fluid pressure, such as would be available at any well drilling site. This system will operate continuously without the need for rewinding or other periodic attention.

A second object is to provide a timer device including a fluid motor having a reciprocated rod member, and means for translating the reciprocating movement thereof into a continuous rotational movement suitable for driving clock mechanisms or the like.

A third object of this invention is to provide fluid motors suitable for driving clocks, records and related mechanisms by utilizing a relatively constant source of pressure.

Another object is to provide means for translating a reciprocating movement of a fluid motor into a continuous and substantially uniform rotational movement, such as would be suitable for driving clock mechanisms.

Other more specific objects will be apparent from a study of the following description and in view of the accompanying drawings.

In the drawings, forming a part of this application, and in which like parts are designated by like reference numerals throughout the same, FIG. 1 is an elevational view, partly in section, of a first embodiment of this invention.

FIG. 2 is a sectional view of a suitable four-way valve structure which may be utilized with this invention.

FIG. 3 is a partial side elevation of the device shown in FIG. 1.

FIG. 4 is a view taken on line 4—4 of FIG. 1.

The time system shown in FIG. 1 comprises essentially a source of fluid pressure taken from a pipe line 1, a fluid motor assembly 2 and motion translating means 3. The source of fluid pressure must be substantially constant to insure the uniform and continuous rotation of an output shaft 4, which may be utilized to operate a clock, chart recorder or other such mechanisms, shown as a box and indicated by reference numeral 5.

Fluid motor assembly 2 is formed with a first housing 11 and a second housing structure 12, which are essentially alike in size and connected together at a spaced distance by rods 13 and 14. Housing 11 is divided into compartments 15 and 16 by a flexible diaphragm 17; and housing 12 is similarly constructed with a flexible diaphragm 18 separating compartments 19 and 20. Adjacent compartments 16 and 19 are fluidly connected by a first conduit 21 and comprise a closed system filled with an incompressible fluid which can flow from compartment 16 to compartment 19, or in the reverse direction.

A valve means 22 is disposed in the conduit 21 to control the rate of flow between the compartments. Therefore, the rate of fluid movement will be determined by the size of opening of valve means 21 and the pressure differentials applied on diaphragms 17 and 18. If the viscosity of the incompressible fluid used in compartments 16 and 19 remained constant throughout various temperature changes, the valve could be a simple needle valve or orifice. However, most suitable fluids will change viscosity over less than extreme temperature changes and it is, therefore, desirable to employ a temperature compensating type valve, such as disclosed in Patent No. 2,966,170.

A rod member 23 connects to the flexible diaphragm 17 and projects outwardly from the housing 11 in which it is mounted for reciprocating movement. Therefore, as the diaphragm 17 is moved to and fro by the operating fluid pressure alternately introduced to compartments 15 and 20, the rod member 23 is also reciprocated.

A conventional valve assembly 24 substantially as shown in FIG. 2 is secured to the housing 11. The valve has a pasageway 51 which communicates with the source of fluid pressure (such as gas) through conduit 25, and a second passageway 52 connects to an exhaust outlet 26. Passageways 53 and 54 connect with compartments 15 and 20, respectively, through an opening 27 and a conduit 28.

A rotary valve element 55 having two oppositely spaced peripheral grooves 56 and 57 therein may be rotated by a trip lever 29, shown in FIG. 1, between a first and second position. In the first position, reference being made to FIG. 2, compartment 20 is placed into fluid communication with the pressure source through conduit 28, passageway 54, groove 57, passageway 51, and conduit 25. Compartment 15 is at such time placed into fluid communication with the exhaust outlet 26 through opening 27, passageway 53, groove 56 and passageway 52. When the rod member 23 is moved upwardly from the position shown in FIG. 2, the collar member 30 will trip lever 29 and rotate valve element 55 into a second position. Groove 57 will then link passageway 53 to passageway 51, and groove 56 will link passageway 54 and passageway 52, causing a reverse connection between the working compartments 15 and 20, the fluid pressure conduit 25 and exhaust outlet 26.

FIGS. 1 and 3 illustrate one form of motion translating means for changing reciprocating movement of the rod member 23 into a substantially continuous and uniform rotary movement of a shaft. Means is provided for mounting the rack plate member 31 onto the reciprocated rod member, whereby the former is moved reciprocally with the latter, and also is moved laterally at the beginning of each stroke. Pins 32 are connected to rod member 23 and project into elliptical slots 33 which are formed in the rack plate. The ends of the pins may be flattened over the outer surface of the rack plate in such manner as to secure the rack plate to the shaft but to permit limited relative movement between rack plate and rod along the major axes of the elliptical slots. Rack plate 31 has a rack surface with first and second parallel and facing portions 34 and 35 which extend axially of the rod member. A pinion 36 is rotatably mounted equidistant of surface portions 34 and 35 when pins 32 are midway between the ends of their respective slots. The size of the pinion is such that it will mesh with one or the other surface portions depending upon slight lateral movements of the rack plate.

Referring more particularly to FIG. 3, a support structure 37 is secured to housing 11 and a journal member 38 in which shaft 39 is supported. Shaft 39 is rigidly connected to pinion 36 and is operated therewith. A spring clutch 40 connects to the journal member 38 and encloses shaft 39, permitting only a clockwise rotation of shaft 39.

As the rod member 23 begins moving upwardly with respect to the pinion 36, pins 32 are also driven upward, engaging the upper surfaces of slots 33 and camming the rack plate to the right, as shown in FIG. 1. The pins are quickly positioned in the upper ends of the slots, but during this short upward travel the teeth of rack surface portion 34 mesh with the teeth of pinion 36 and cause the pinion and shaft 39 to rotate in a clockwise direction. Before the rack plate reaches its uppermost position, collar member 30 trips the valve lever 29 and moves the valve element 55 into the above described second position. The pressure fluid is then redirected into compartment 15, causing the diaphragm 17 to flex downwardly and force fluid from compartment 16 into compartment 19, and operating fluid from compartment 20 and out the exhaust outlet 26.

Since spring clutch 40 permits only a clockwise rotation of shaft 39, pinion 36 will also be restrained from turning. Accordingly, rack plate 31 will be supported upon the teeth of pinion 36 as rod member 23 begins a downward movement with the diaphragm 17. Pins 32 quickly engage the lower surfaces of slots 33, camming the rack plate laterally and putting rack surface 35 in mesh with the pinion. Since the pinion closely abuts the surface portions 34 and 35, a slight downward movement will effect a change in meshing of the pinion from one surface portion to the other. Thus, there is no slippage or lost motion of pinion 36, and shaft 39 continues to rotate in the clockwise direction.

As shown in FIG. 4, a pair of spring washer members 31a and 31b is provided on the rack plate to hold it in an engaged position until the direction of rod movement reverses. Each washer member frictionally engages rod member 23 and resiliently biases the rack plate to one lateral position or the other, depending on the most recent reversal of rod movement.

As rod 23 approaches the end of its downward stroke, collar member 30 comes into contact with valve lever 29 and rotates valve element 55 into the first position as shown by FIG. 2. Now the cycle is repeated as just explained and is continued so long as a source of power gas is applied to the fluid motor assembly; thus, the force exerted by the gas develops a reciprocating power stroke of rod 23, which in turn is translated into a substantially continuous and uniform rotary movement of a shaft to provide a constant drive for a clock, chart recorder, or other such device.

It is to be understood that the form of the invention herewith shown and described is to be taken as a preferred example of the same, and that various changes in the shape, size and arrangement of parts may be resorted to, without departing from the spirit of the invention, or the scope of the attached claims.

Having thus described our invention, what we claim and desire to secure by Letters Patent is:

1. A motion translating mechanism for continuously rotating a shaft in response to linear reciprocation of a driven member, comprising: a reciprocated rod; a slotted rack plate having an elongate opening therein, first and second parallel rack surfaces formed on the inward facing sides of said opening and extending lengthwise thereof; means mounting said rack plate to said rod including a pair of pin and slot connections, a pair of spring washer members, each spring washer being mounted upon a pin and disposed intermediate said rod and rack plate to frictionally engage and resiliently hold said rack plate in a lateral position relative to said rod, each slot being angled from the axis of said reciprocated rod to produce lateral movement of the rack plate at the beginning of each stroke of said rod, said rack surfaces extending parallel with the axis of said rod; a pinion rotatably mounted between said first and second parallel rack surfaces and being of such size that it will mesh with one or the other of said surfaces depending upon slight lateral movements of said rack plate; a clutch device connected to said pinion for transmitting one-way rotational movement; and means for reciprocally moving said reciprocated rod along its axis.

2. A motion translating mechanism for continuously rotating a shaft in response to linear reciprocation of a driven member, comprising: a rod reciprocated on its longitudinal axis; a slotted rack plate having an elongate opening therein; first and second parallel rack surfaces formed on the inward facing sides of said opening, and extending lengthwise thereof, said rack surfaces being parallel to the direction of said reciprocation; means mounting said rack plate to said rod including a pair of pin and slot connections; said pins being reciprocated with said rod; said slots being formed in said rack plate to slidably accommodate said pins and mount said rack plate with said rack surfaces parallel to said direction of reciprocation, and at an angle from said axis of said rod to produce lateral movement of said rack plate at the beginning of each reciprocation of said rod; a pinion rotatably mounted between said first and second parallel rack surfaces and being of such size that it will mesh with one or the other of said surfaces, depending upon said lateral movements of said rack plate; a clutch device connected to said pinion for transmitting one-way rotational movement to said shaft; and means for reciprocating said rod along said axis.

3. A motion translating mechanism for continuously rotating a shaft in response to linear reciprocation of a driven rod member, comprising: a rod reciprocated on its longitudinal axis; a slotted rack plate having an elongate opening therein; first and second parallel rack surfaces formed on the inward facing sides of said opening and extending lengthwise thereof, said rack surfaces being parallel to the direction of said reciprocation; means mounting said rack plate to said rod including a pair of pin and slot connections, said pins being rigidly secured to said rod and said slots slidably accommodating said pins and being formed in said rack plate intermediate said first and said second rack surfaces, said slots lying at an angle from the axis of said rod to produce lateral movement of said rack plate at the beginning of each reciprocation of said rod; a pinion rotatably mounted between said first and second parallel rack surfaces and being of such size that it will mesh with one or the other of said surfaces, depending upon said lateral movements of said rack plate; a clutch device connected to said pinion for transmitting one-way rotational movement to said shaft; and means for reciprocating said rod along said axis.

References Cited by the Examiner
UNITED STATES PATENTS

| | | | |
|---|---|---|---|
| 555,242 | 2/1896 | Hallenbeck | 74—31 |
| 566,198 | 8/1896 | Livoni | 74—31 |
| 1,060,429 | 4/1913 | Coyne | 74—13 |
| 1,078,151 | 11/1913 | Lamb | 74—132 |
| 1,087,965 | 2/1914 | Meredith et al. | 74—30 |
| 2,385,457 | 9/1945 | Morgan | 74—132 |

FOREIGN PATENTS 58,101   5/1953   France.

References Cited by the Applicant
UNITED STATES PATENTS 2,966,170   12/1960   Raulins.

BROUGHTON G. DURHAM, *Primary Examiner.*